US008622312B2

(12) United States Patent
Norair

(10) Patent No.: US 8,622,312 B2
(45) Date of Patent: Jan. 7, 2014

(54) METHOD AND APPARATUS FOR INTERFACING WITH A SMARTCARD

(75) Inventor: John Peter Norair, San Francisco, CA (US)

(73) Assignee: Blackbird Technology Holdings, Inc., Dover, DE (US)

( * ) Notice: Subject to any disclaimer, the term of this patent is extended or adjusted under 35 U.S.C. 154(b) by 191 days.

(21) Appl. No.: 13/297,348

(22) Filed: Nov. 16, 2011

(65) Prior Publication Data

US 2012/0118952 A1 May 17, 2012

Related U.S. Application Data

(60) Provisional application No. 61/456,950, filed on Nov. 16, 2010.

(51) Int. Cl.
*G06K 19/00* (2006.01)
(52) U.S. Cl.
USPC ........................................... 235/492; 235/487
(58) Field of Classification Search
USPC ................................................. 235/487, 492
See application file for complete search history.

(56) References Cited

U.S. PATENT DOCUMENTS

| 5,338,625 | A  | 8/1994  | Bates           |
| 5,729,557 | A  | 3/1998  | Gardner et al.  |
| 5,959,281 | A  | 9/1999  | Domiteaux       |
| 6,115,379 | A  | 9/2000  | Flanders et al. |
| 6,307,846 | B1 | 10/2001 | Willey          |
| 6,330,700 | B1 | 12/2001 | Morris          |
| 6,381,243 | B1 | 4/2002  | Ekstedt         |
| 6,388,997 | B1 | 5/2002  | Scott           |
| 6,549,959 | B1 | 4/2003  | Yates et al.    |

(Continued)

FOREIGN PATENT DOCUMENTS

| EP | 1321009 B1    | 1/2007 |
| WO | 2006001556 A1 | 1/2006 |
| WO | 2009023592 A2 | 2/2009 |

OTHER PUBLICATIONS

PCT International Searching Authority, Notification Concerning Transmittal of the International Search Report and the Written Opinion of the International Searching Authority, or the Declaration, in International application No. PCT/US2011/55118, dated Feb. 28, 2012. (25 pages).

(Continued)

*Primary Examiner* — Michael G Lee
*Assistant Examiner* — Matthew Mikels
(74) *Attorney, Agent, or Firm* — McAndrews, Held & Malloy, Ltd.

(57) ABSTRACT

A device may be configured such that a smartcard may be physically mounted in, on, and/or to the device. The device may comprise one or more circuits that enable communicating over a far-field communication link and that enable communicating with a smartcard when the smartcard is physically mounted in, on, and/or to the device. The far-field communication link may be an ISO 18000-7 link. The device may communicate with a smartcard via contacts and/or via near-field communications. The device may be operable to relay data between a near-field communication link between the device and a smartcard and a far-field communication link between the device and another device. The device may be generally rectangular in shape, less than one centimeter thick, than one centimeter longer than an ISO 7816 compliant smartcard, and less than one centimeter wider than an ISO 7816 compliant smartcard.

20 Claims, 9 Drawing Sheets

(56) References Cited

U.S. PATENT DOCUMENTS

| | | |
|---|---|---|
| 6,665,308 B1 | 12/2003 | Rakib |
| 6,700,491 B2 | 3/2004 | Shafer |
| 6,705,531 B1 | 3/2004 | Norton |
| 6,714,559 B1 | 3/2004 | Meier |
| 6,771,985 B1 | 8/2004 | Iinuma |
| 7,233,603 B2 | 6/2007 | Lee |
| 7,280,555 B2 | 10/2007 | Stanforth |
| 7,305,237 B2 | 12/2007 | Stephens |
| 7,308,103 B2 | 12/2007 | Corcoran |
| 7,330,446 B2 | 2/2008 | Lee |
| 7,369,512 B1 | 5/2008 | Shurbanov et al. |
| 7,606,256 B2 | 10/2009 | Vitebsky |
| 7,643,509 B2 | 1/2010 | Han et al. |
| 7,672,284 B2 | 3/2010 | Sugar et al. |
| 7,689,195 B2 | 3/2010 | Wu |
| 7,698,463 B2 | 4/2010 | Ogier et al. |
| 7,735,116 B1 | 6/2010 | Gauvin |
| 7,805,129 B1 | 9/2010 | Issa |
| 7,814,107 B1 | 10/2010 | Thirumalai et al. |
| 7,890,839 B2 | 2/2011 | Iwami |
| 7,962,361 B2 | 6/2011 | Ramchandani |
| 2002/0025823 A1 | 2/2002 | Hara |
| 2002/0078045 A1 | 6/2002 | Dutta |
| 2003/0115369 A1 | 6/2003 | Walter |
| 2003/0154243 A1 | 8/2003 | Crockett |
| 2003/0183691 A1 | 10/2003 | Lahteenmaki |
| 2004/0157631 A1 | 8/2004 | Stobart |
| 2004/0218557 A1 | 11/2004 | Kim et al. |
| 2005/0078038 A1 | 4/2005 | Takaki |
| 2005/0083943 A1 | 4/2005 | Lee et al. |
| 2005/0128086 A1 | 6/2005 | Brown |
| 2005/0135291 A1 | 6/2005 | Ketchum et al. |
| 2005/0139685 A1 | 6/2005 | Kozlay |
| 2005/0174953 A1 | 8/2005 | Ho |
| 2005/0177633 A1 | 8/2005 | Plunkett |
| 2006/0002312 A1 | 1/2006 | Delattre et al. |
| 2006/0061795 A1 | 3/2006 | Walmsley |
| 2006/0088021 A1 | 4/2006 | Nelson et al. |
| 2006/0091223 A1 | 5/2006 | Zellner |
| 2006/0219776 A1 | 10/2006 | Finn |
| 2006/0220867 A1 | 10/2006 | Dixon |
| 2007/0000316 A1 | 1/2007 | Lauer |
| 2007/0010928 A1 | 1/2007 | Brusarosco |
| 2007/0083924 A1 | 4/2007 | Lu |
| 2007/0099641 A1 | 5/2007 | Lastinger |
| 2007/0125836 A1 | 6/2007 | McAllister et al. |
| 2007/0211532 A1 | 9/2007 | Gonzalez et al. |
| 2007/0232281 A1 | 10/2007 | Nakai |
| 2007/0295074 A1 | 12/2007 | Kobayakawa |
| 2008/0041936 A1 | 2/2008 | Vawter |
| 2008/0075123 A1 | 3/2008 | Fourcand |
| 2008/0107060 A1 | 5/2008 | Andou et al. |
| 2008/0130597 A1 | 6/2008 | Kalhan |
| 2008/0164325 A1 | 7/2008 | Borracci |
| 2008/0172357 A1 | 7/2008 | Rechis |
| 2008/0186857 A1 | 8/2008 | Becker |
| 2008/0186867 A1 | 8/2008 | Schoo et al. |
| 2008/0209322 A1 | 8/2008 | Kaufman |
| 2008/0228592 A1 | 9/2008 | Kotas |
| 2008/0238621 A1 | 10/2008 | Rofougaran |
| 2008/0256409 A1 | 10/2008 | Oran et al. |
| 2008/0302177 A1 | 12/2008 | Sinnett |
| 2008/0320139 A1 | 12/2008 | Fukuda |
| 2009/0003376 A1 | 1/2009 | Horvat |
| 2009/0055377 A1 | 2/2009 | Hedge |
| 2009/0069049 A1 | 3/2009 | Jain |
| 2009/0113267 A1 | 4/2009 | Harrison |
| 2009/0138948 A1 | 5/2009 | Calamera |
| 2009/0141531 A1 | 6/2009 | Abedin |
| 2009/0171749 A1 | 7/2009 | Laruelle |
| 2009/0171947 A1 | 7/2009 | Karayel |
| 2009/0210898 A1 | 8/2009 | Childress et al. |
| 2009/0251295 A1 | 10/2009 | Norair |
| 2009/0268674 A1 | 10/2009 | Liu |
| 2009/0279652 A1 | 11/2009 | Sinha |
| 2009/0286496 A1 | 11/2009 | Yavuz et al. |
| 2010/0026589 A1 | 2/2010 | Dou |
| 2010/0078471 A1 | 4/2010 | Lin |
| 2010/0082893 A1 | 4/2010 | Ma et al. |
| 2010/0097957 A1 | 4/2010 | Pirzada et al. |
| 2010/0177696 A1 | 7/2010 | Jung |
| 2010/0179877 A1 | 7/2010 | Lam |
| 2010/0181377 A1 | 7/2010 | Chen |
| 2010/0190437 A1 | 7/2010 | Buhot |
| 2010/0197261 A1 | 8/2010 | Zibrik et al. |
| 2010/0228617 A1 | 9/2010 | Ransom et al. |
| 2010/0256976 A1 | 10/2010 | Atsmon |
| 2010/0295681 A1 | 11/2010 | Burns et al. |
| 2011/0003607 A1 | 1/2011 | Forenza et al. |
| 2011/0007733 A1 | 1/2011 | Kubler et al. |
| 2011/0112892 A1 | 5/2011 | Tarantino |
| 2012/0001730 A1* | 1/2012 | Potyrailo et al. ............. 340/10.1 |
| 2012/0086615 A1 | 4/2012 | Norair |
| 2012/0087267 A1 | 4/2012 | Norair |
| 2012/0087350 A1 | 4/2012 | Norair |
| 2012/0088449 A1 | 4/2012 | Norair |
| 2012/0116694 A1 | 5/2012 | Norair |
| 2012/0116887 A1 | 5/2012 | Norair |
| 2012/0191848 A1 | 7/2012 | Norair |
| 2012/0191901 A1 | 7/2012 | Norair |
| 2012/0207141 A1 | 8/2012 | Norair |
| 2012/0209716 A1 | 8/2012 | Burns |
| 2012/0224491 A1 | 9/2012 | Norair |
| 2012/0224530 A1 | 9/2012 | Norair |
| 2012/0224543 A1 | 9/2012 | Norair |
| 2012/0224590 A1 | 9/2012 | Norair |
| 2012/0225687 A1 | 9/2012 | Norair |
| 2012/0226822 A1 | 9/2012 | Norair |
| 2012/0226955 A1 | 9/2012 | Norair |

OTHER PUBLICATIONS

PCT International Searching Authority, Notification Concerning Transmittal of the International Search Report and the Written Opinion of the International Searching Authority, or the Declaration, in International application No. PCT/US11/55082, dated Mar. 1, 2012 (13 pages).

PCT International Searching Authority, Notification Concerning Transmittal of the International Search Report and the Written Opinion of the International Searching Authority, or the Declaration, in International application No. PCT/US11/55934, dated Mar. 6, 2012 (11 pages).

PCT International Searching Authority, Notification Concerning Transmittal of the International Search Report and the Written Opinion of the International Searching Authority, or the Declaration, in International application No. PCT/US2011/055929, dated Jan. 30, 2012. (15 pages).

PCT International Searching Authority, Notification Concerning Transmittal of the International Search Report and the Written Opinion of the International Searching Authority, or the Declaration, in International application No. PCT/US2011/059292, dated Feb. 2, 2012. (12 pages).

PCT International Searching Authority, Notification Concerning Transmittal of the International Search Report and the Written Opinion of the International Searching Authority, or the Declaration, in International application No. PCT/US11/059304, dated Mar. 9, 2012 (11 pages).

PCT International Searching Authority, Notification Concerning Transmittal of the International Search Report and the Written Opinion of the International Searching Authority, or the Declaration, in International application No. PCT/US12/22005, dated Mar. 29, 2012. (12 pages).

PCT International Searching Authority, Notification Concerning Transmittal of the International Search Report and the Written Opinion of the International Searching Authority, or the Declaration, in International application No. PCT/US12/22002, dated May 8, 2012. (13 pages).

Patent Cooperation Treaty, Notification of Transmittal of the International Search Report and the Written Opinion of the International

(56) References Cited

OTHER PUBLICATIONS

Searching Authority, or the Declaration, in International application No. PCT/US2011/060950, dated Mar. 16, 2012. (14 pages).

PCT International Searching Authority, Notification Concerning Transmittal of the International Search Report and the Written Opinion of the International Searching Authority, or the Declaration, in International application No. PCT/US2012/025191 dated May 25, 2012 (8 pages).

PCT International Searching Authority, Notification Concerning Transmittal of the International Search Report and the Written Opinion of the International Searching Authority, or the Declaration, in International application No. PCT/US2012/025197 dated May 25, 2012 (7 pages).

PCT International Searching Authority, Notification Concerning Transmittal of the International Search Report and the Written Opinion of the International Searching Authority, or the Declaration, in International application No. PCT/US2012/027382 dated May 31, 2012 (10 pages).

PCT International Searching Authority, Notification Concerning Transmittal of the International Search Report and the Written Opinion of the International Searching Authority, or the Declaration, in International application No. PCT/US2012/027381 dated May 31, 2012 (13 pages).

PCT International Searching Authority, Notification Concerning Transmittal of the International Search Report and the Written Opinion of the International Searching Authority, or the Declaration, in International application No. PCT/US2012/027387 dated Jun. 6, 2012 (14 pages).

PCT International Searching Authority, Notification Concerning Transmittal of the International Search Report and the Written Opinion of the International Searching Authority, or the Declaration, in International application No. PCT/US2012/27378 dated Jun. 13, 2012 (14 pages).

PCT International Searching Authority, Notification Concerning Transmittal of the International Search Report and the Written Opinion of the International Searching Authority, or the Declaration, in International application No. PCT/US2012/027379 dated Jun. 20, 2012 (16 pages).

PCT International Searching Authority, Notification Concerning Transmittal of the International Search Report and the Written Opinion of the International Searching Authority, or the Declaration, in International application No. PCT/US2012/027384 dated Jun. 20, 2012 (10 pages).

PCT Int'l Searching Authority, Notification Concerning Transmittal of the Int'l Search Report and the Written Opinion of the Int'l Searching authority or the Declaration in Int'l application No. PCT/US2012/027386 dated Oct. 16, 2012.

* cited by examiner

METHOD AND APPARATUS FOR INTERFACING WITH A SMARTCARD

CLAIM OF PRIORITY

This patent application makes reference to, claims priority to and claims benefit from U.S. Provisional Patent Application Ser. No. 61/456,950 filed on Nov. 16, 2011.

The above-referenced application is hereby incorporated herein by reference in its entirety.

INCORPORATION BY REFERENCE

This patent application also makes reference to:
U.S. Provisional Patent Application Ser. No. 61/464,376 filed on Mar. 2, 2011;
U.S. patent application Ser. No. 13/270,802 filed on Oct. 11, 2011; and
U.S. patent application Ser. No. 13/270,959 filed on Oct. 11, 2011;

Each of the above-reference applications is hereby incorporated herein by reference in its entirety.

FIELD OF THE INVENTION

Certain embodiments of the invention relate to electronics. More specifically, certain embodiments of the invention relate to a method and apparatus for interfacing with a smartcard.

BACKGROUND OF THE INVENTION

Conventional methods and apparatus for interfacing with smartcards are limited in terms of functionality and ability to take advantage of the features and benefits of smartcards. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for interfacing with a smartcard, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, each of the terms "e.g." and "for example" introduces a list of one or more non-limiting examples, instances, or illustrations.

Figure 1C:
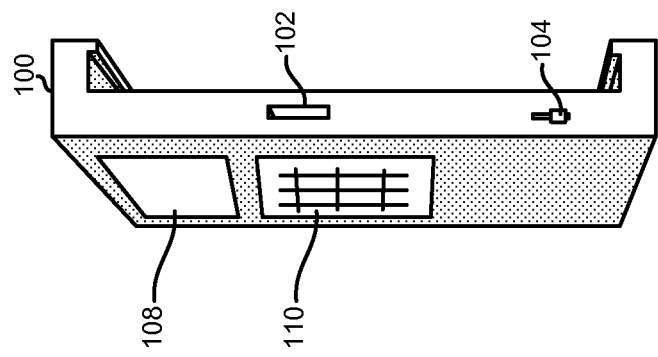
FIGS. 1A-1C each depict a three-dimensional profile view of an exemplary smartcard interface device.
Figure 1B:
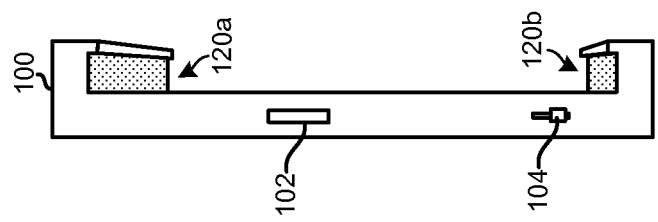
Figure 1A:
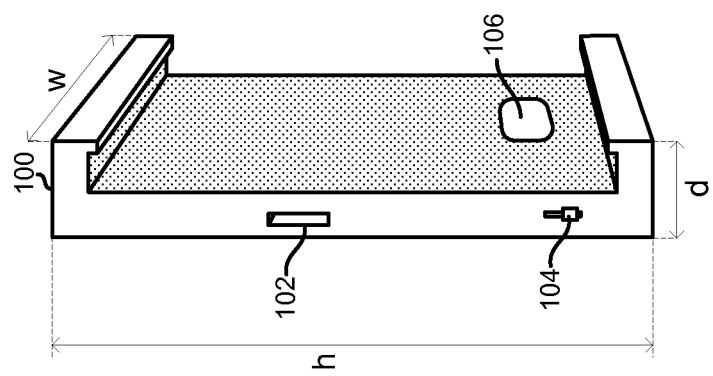

FIGS. 1A-1C each depict a three-dimensional profile view of an exemplary smartcard interface device. The view in FIG. 1A shows a left side of an exemplary smartcard interface device 100 on which there is a port 102 and a switch 104, and the back of the device 100 on which there is a conductive surface 106. The port 102 may, for example, be a USB port or port utilizing any other suitable communication protocol. The switch 104 may be a power switch to turn the device 100 on and off and/or select a mode of operation of the device 100.

The exemplary smartcard interface device 100 may be made of plastic and/or metal. The exemplary smartcard interface device 100 has a height 'h', depth 'd', and width 'w'. The form factor of the device 100 may vary depending on the form factor of the smartcard(s) with which it is intended to interface. For example, for interfacing with an ISO 7816 compliant smartcard, 'h' may be less than 1 cm larger than the length of an ISO 7816 compliant smartcard, 'w' may be less than 1 cm larger than the width of an ISO 7816 compliant smartcard, and 'd' may be less than 1 cm larger than the depth of an ISO 7816 compliant smartcard. In this manner, the device 100 with the smartcard mounted in, on, and/or to it, is not much larger than the smartcard by itself. In some instances, the device 100 may be adjustable and/or adaptable (e.g., via an insert) to accommodate smartcards of varying dimensions.

In FIG. 1B, the device 100 has been rotated along a vertical axis such that only the left side of the device is shown. In the exemplary device 100 shown, a smartcard physically mounted in, on, and/or to the device 100 may be retained by the channels 120a and 120b. While mounted in, on, and/or to the device 100, the body of the smartcard 300 may be in physical contact with the body of the device 100 and/or may be enclosed or partially enclosed by the device 100. While mounted in, on, and/or to the device 100, there may, for example, be one or more latches, doors, retaining clips, or other mechanisms for securing the smartcard in place such that the device 100 can be rotated 360° along any axis without the smartcard becoming unmounted from the device 100.

In an exemplary embodiment, a smartcard may be locked in the device 100 such that only a user with a key, which can be a physical key or an electronic key (e.g., a pin or password) can access the smartcard. That is, with the key, the smartcard 300 may be prevented (e.g., through RF shielding or jamming or other security measures) from communicating with other devices while locked inside the device 100.

In FIG. 1C, the device 100 is further rotated along the vertical axis such that the front of the device 100 is shown. On the front, there is a display 108 and an input device 110. The input device 110 may comprise circuitry operable to receive input from a user of the smartcard 100 and convert the input to digital signals. For example, the input device(s) 110 may comprise one or more hard and/or soft buttons, dials, and/or a touchscreen. The display 108 may comprise circuitry operable to output visual signals to a user of the smartcard. For example, the display 108 may be an OLED or bistable electrophoretic type display.

Figure 1E:
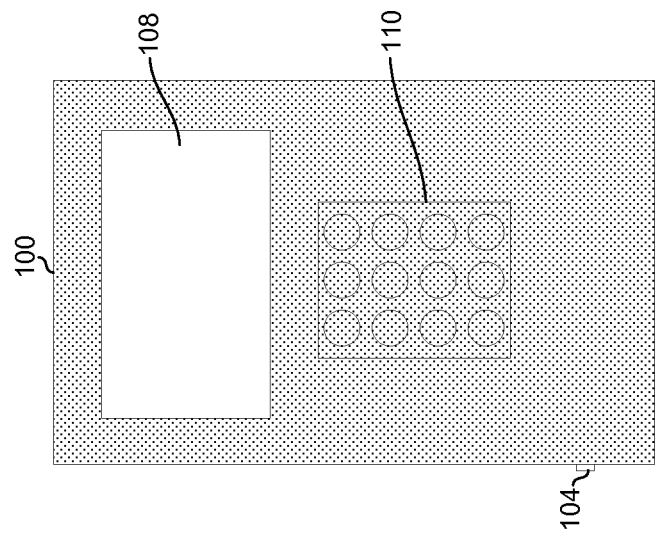
FIG. 1E is a plan view of the back of an exemplary smartcard interface device.
Figure 1D:
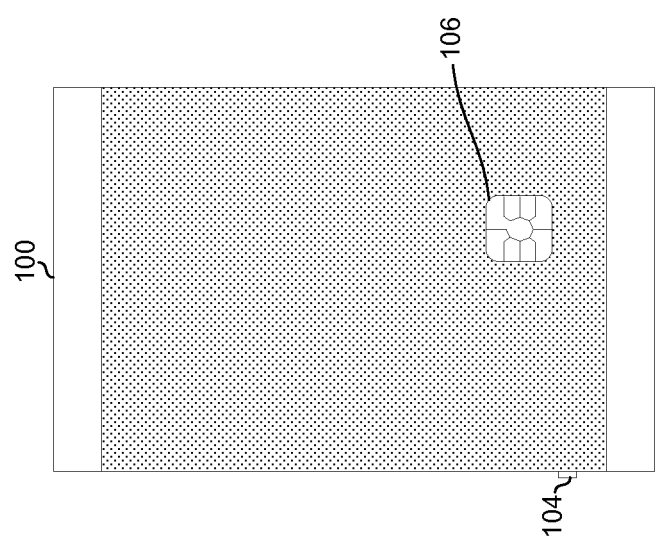
FIG. 1D is a plan view of the front of an exemplary smartcard interface device.

FIG. 1D is a plan view of the front of an exemplary smartcard interface device. Shown are the switch 104, which is on the left side of the device 100, and the conductive surface 106.

FIG. 1E is a plan view of a back side of an exemplary smartcard interface device. Shown are the display 108 and the input device 110 which, for the exemplary device 100 depicted, comprises a plurality of buttons. In an exemplary embodiment of the invention, one of the buttons may be a check-in button that enables a user of the device 100 to "check in," via a near-field or far-field communication link, to a location-based service, such as a location-based social networking site.

Figure 2:
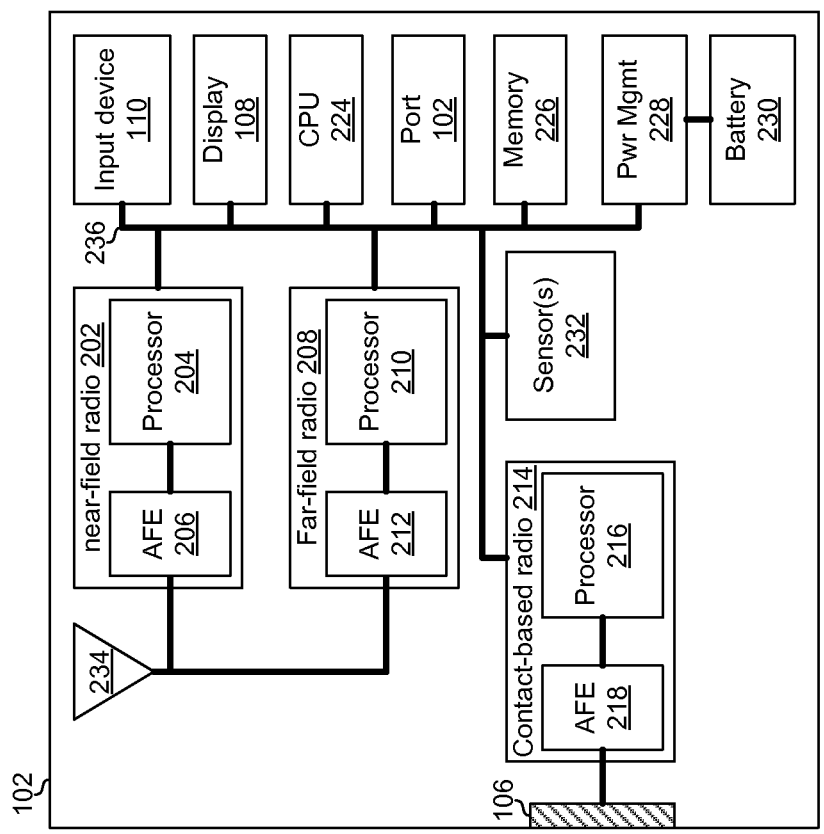
FIG. 2 depicts circuitry of an exemplary smartcard interface device.

FIG. 2 depicts circuitry of an exemplary smartcard interface device. The exemplary device 100 comprises a variety of modules including: a near-field radio 202, a far-field radio 208, a contact-based radio 214, input device(s) 110, a display 108, a central processing unit (CPU) 224, a memory 226, a power management module 228, a battery 230, one or more sensors 232, and an antenna 234.

The near-field radio 202 may comprise circuitry operable to communicate in accordance with one or more near-field communication protocols. For example, the near-field radio 202 may comprise an analog front-end (AFE) 206 and a processor 204 operable to communicate in accordance with one or more near-field protocols (e.g., protocols specified in ISO 18092, ISO 14443, and/or ISO 18000-3). The processor 204 may comprise circuitry operable to interface with the AFE 206 to receive and transmit data, and to process received and to-be-transmitted data. For transmission, the processor 204 may be operable to receive data via the bus 236, packetize and/or otherwise process the data to prepare it for transmission in accordance with one or more near-field protocols, and output the data to the AFE 206 for transmission. For reception, the processor 204 may be operable to receive data via the AFE 206, process the received data and output received data onto the bus 236.

In an exemplary embodiment, the device 100 may comprise a plurality of near-field radios 202 and corresponding antennas 234 such that the device 100 may simultaneously transmit and receive near-field signals. In such an embodiment, the device 100 may operate as a repeater and/or range extender for near-field communications.

In an exemplary embodiment, the device 100 may be operable to concurrently receive via the near-field radio 202 and transmit via the far-field radio 208. Similarly, the device 100 may be operable to concurrently transmit via the near-field radio 202 and receive via the far-field radio 208. In this manner, the device 100 may function as a proxy or repeater translating between near-field and far-field communications. Such functionality may enable, for example, wide-area mobile payments with a smartcard.

In an exemplary embodiment, "peer-to-peer" communications may be enabled between a plurality of smartcards 300 via a corresponding plurality of devices 100.

The far-field radio 208 may comprise circuitry operable to communicate in accordance with one or more near-field communication protocols. For example, the far-field radio 208 may comprise an analog front-end (AFE) 212 and a processor 210 operable to communicate in accordance with one or more far-field protocols (e.g., Bluetooth, Wi-Fi, protocols specified in ISO 18000-7, and/or protocols in the above-incorporated U.S. Provisional Patent Application 61/464,376 filed on Mar. 2, 2011). The processor 210 may comprise circuitry operable to interface with the AFE 212 to receive and transmit data, and to process received and to-be-transmitted data. For transmission, the processor 210 may be operable to receive data via the bus 236, packetize and/or otherwise process the data to prepare it for transmission in accordance with one or more far-field protocols (e.g., Bluetooth, Wi-Fi, protocols specified in ISO 18000-7, and/or protocols in the above-incorporated U.S. Provisional Patent Application 61/464,376 filed on Mar. 2, 2011), and output the data to the AFE 212 for transmission. For reception, the processor 210 may be operable to receive data via the AFE 212, process the received data and output received data onto the bus 236.

The contact-based radio 214 may comprise circuitry operable to communicate in accordance with one or more near-field communication protocols. For example, the contact-based radio 214 may comprise an analog front-end (AFE) 218 and a processor 216 operable to communicate in accordance with one or more near-field protocols (e.g., protocols specified in ISO 7816). The processor 216 may comprise circuitry operable to interface with the AFE 218 to receive and transmit data, and to process received and to-be-transmitted data. For transmission, the processor 216 may be operable to receive data via the bus 236, packetize and/or otherwise process the data to prepare it for transmission in accordance with one or more near-field protocols, and output the data to the AFE 218 for transmission. For reception, the processor 216 may be operable to receive data via the AFE 218, process the received data and output received data onto the bus 236.

Although the radios 202, 208, and 214 are depicted as being separate modules, hardware, firmware, and/or software may be shared among the modules. For example, the processors 204, 210, and 216 may be implemented by the same hardware and simply execute different instructions depending on which radio is in use.

The port 102, display 108, and input device 110 may be as described above with respect to FIGS. 1A-1E.

The CPU 224 may comprise circuitry operable to control operation of the device 100. The CPU 224 may, for example, execute an operating system and/or other programs. The CPU 224 may generate one or more control signals for controlling the operation of the device 100. The CPU 224 may, for example, control a mode of operation of the device 100 in response to a position of the switch 104.

The memory 226 may comprise one or more memory cells and may be operable to store data to the memory cell(s) and read data from the memory cell(s). The one or more memory cell may comprise one or more volatile memory cells and/or one or more non-volatile memory cells.

The power management module 228 may comprise circuitry operable to manage power allocation and/or power consumption in the device 100. The power management module 228 may be operable to, for example, dim and/or turn off the display 108 when it is not needed, turn off one or more of the sensors 232 when not needed, turn off the input device(s) 110 when not needed, adjust a receive sensitivity of one or more of the radios 202, 208, and 214, and/or adjust a transmit power of one or more of the radios 202, 208, and 214. Additionally and/or alternatively, the power management module 228 may control charging of the battery 230. For example, the power management module 228 may comprise an energy harvesting circuitry (e.g., to harvest solar energy, kinetic energy, and/or energy inductively coupled to the power management module 228) for charging the battery 230 and/or powering various components of the device 100. Additionally and/or alternatively, the power management module 228 may be operable to charge the battery 230 and/or power various components of the device 100 via energy received via the port 102. In an exemplary embodiment, certain components and/or functions of the device 100 may be disabled when the device 100 is not receiving power via, for example, inductive coupling and/or the surface 106, and may be enabled when the smartcard is receiving power via, for example, inductive coupling and/or the surface 106.

In an exemplary embodiment, the power management module 228 may power portions of the device 100 on and off in response to wakeup signals detected via one or more of the radios 202, 208, and 214. For example, upon receiving a wakeup signal, the device 100 may power up, execute a routine such as reading and/or writing to a smartcard, and then go back to sleep. The wake signal may be for example, a low frequency (e.g., 125 kHz) signal, a high frequency (e.g., 13.56 MHz) RFID signal, or an ultra-high frequency (e.g., 433.92 MHz) RFID signal.

In an exemplary embodiment, the device 100 may wake up upon light hitting an optical sensor (e.g., solar cell) of the device 100 and/or upon a motion sensor of the device 100 detecting movement.

The battery 230 may be, for example, a thin film and/or coin cell battery. In an exemplary embodiment, the battery may be as described in the above-incorporated U.S. patent application Ser. No. 13/270,959 filed on Oct. 12, 2010.

The sensor(s) 232 may comprise one or more of: an acoustic sensor operable to sense, for example amplitude, phase, polarization, spectrum and/or wave velocity of acoustic waves (e.g., voice recognition); a chemical sensor operable to sense, for example the presence of any one or more elements and/or compounds in solid, gas, and/or liquid form; an electrical sensor operable to detect, for example amplitude, phase, polarization, and/or spectrum of a current and/or voltage, conductivity, and/or permittivity; a magnetic sensor operable to, for example detect flux, permeability, amplitude, phase, and/or polarization of a magnetic field (e.g., a magnetic stripe reader); a mechanical sensor operable to detect, for example position, acceleration, force, stress, pressure, strain, mass, density, moment, torque, shape, roughness, orientation, and/or stiffness; an optical sensor operable to detect, for example amplitude, phase, polarization, and/or spectrum of an optical wave, wave velocity, refractive index, emissivity, reflectivity, and/or absorption (e.g., a camera and/or barcode reader); and/or a thermal sensor operable to detect, for example temperature, flux, specific heat, and/or thermal conductivity. The sensor(s) 232 may, for example, generate an interrupt to the CPU 224 when an alarm condition is present.

The antenna 234 may be operable to transmit and receive electromagnetic signals in one or more frequency bands. In an exemplary embodiment, the antenna 234 may be operable to transmit and receive signals in the ISM frequency band centered at 433.92 MHz and in the ISM frequency band centered at 13.56 MHz. In one exemplary embodiment, the antenna 234 of the device 100 may be leveraged by a smartcard mounted in, on, and/or to the device 100 to improve transmission and/or reception by the smartcard. In another exemplary embodiment, the antenna 234 may be absent and the device 100 may instead transmit and/or receive via an antenna present on a smartcard mounted in, on, and/or to the device 100.

Figure 3B:
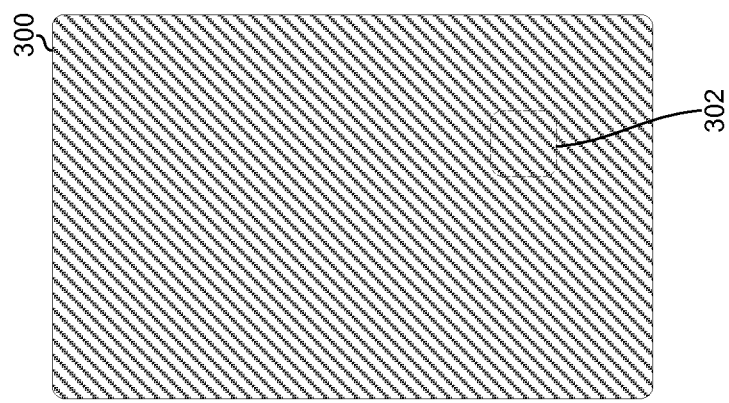
FIG. 3B is a plan view of a back side of an exemplary smartcard.
Figure 3A:
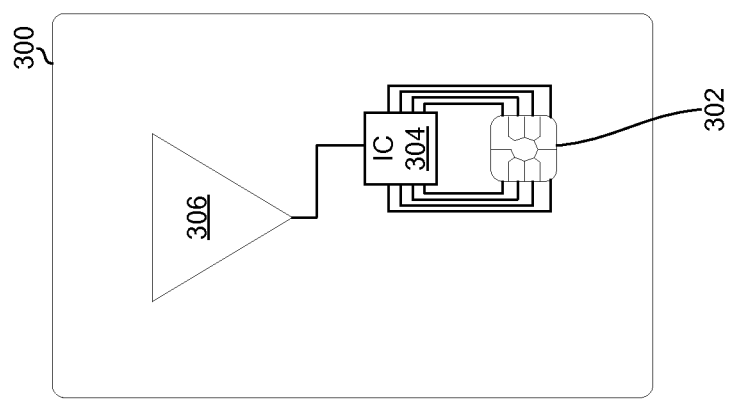
FIG. 3A is a plan view of a front side of an exemplary smartcard.

FIG. 3A is a plan view of a front side of an exemplary smartcard. FIG. 3B is a plan view of a back side of an exemplary smartcard. Referring to FIG. 3A, the exemplary smartcard 300 may comprises a conductive surface 302, an integrated circuit (IC) 304, and antenna 306. The conductive surface 302 may comprise a plurality of contacts coupled to the integrated circuit 304. The smartcard 300 may be, for example, a credit card, a debit card, a driver's license, retail loyalty card, or an identification badge. The IC 304 may comprise memory and other circuitry operable to communicate via the conductive surface 302 and/or communicate wirelessly via the antenna 306. Wireless communications via the antenna 306 may be in accordance with, for example, ISO 14443. The smartcard may be as described, for example, in the above-referenced U.S. patent application Ser. No. 13/270, 802 filed on Oct. 11, 2011.

Figure 4A:
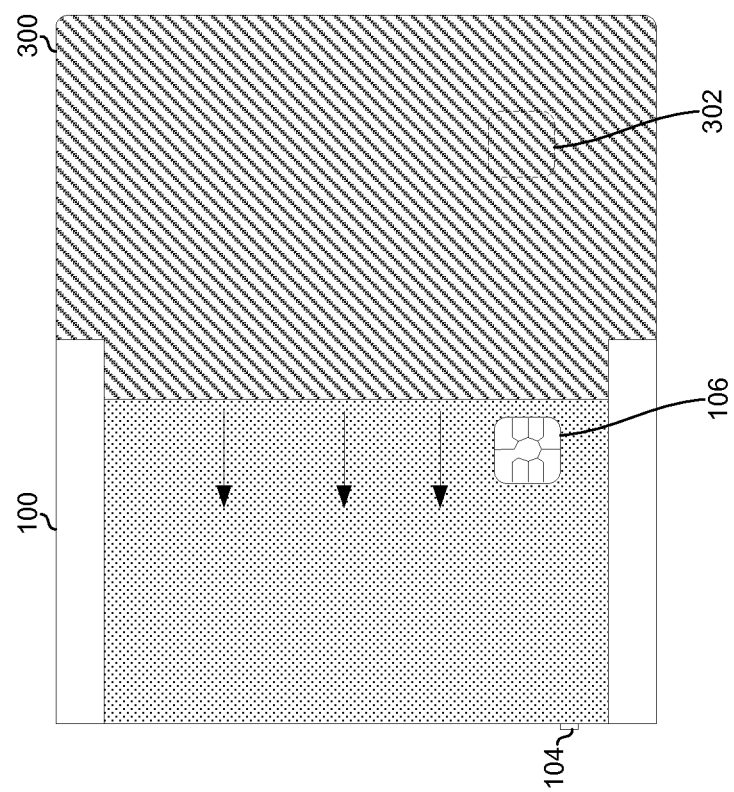
FIG. 4A depicts a smartcard being mounted in, on, and/or to an exemplary side-loading smartcard interface device.

FIG. 4A depicts a smartcard being mounted in, on, and/or to an exemplary side-loading smartcard interface device. In FIG. 4A, the smartcard 300 slides into the device 100 from the left or right side of the device 100. As the smartcard 300 slides in, it may latch or click into place when the conductive surface 302 is aligned and in conductive contact with the conductive surface 106.

Figure 4B:
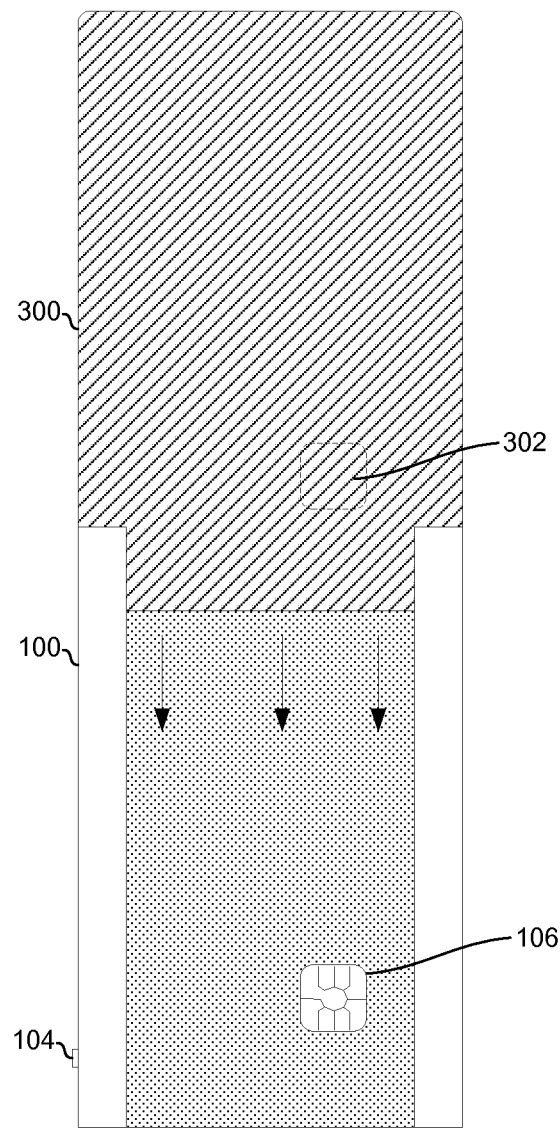
FIG. 4B depicts a smartcard being mounted in, on, and/or to an exemplary top-loading smartcard interface device.

FIG. 4B depicts a smartcard being mounted in, on, and/or to an exemplary top-loading smartcard interface device. In FIG. 4B, the smartcard 300 slides into the device 100 from the top side of the device 100. As the smartcard 300 slides in, it may latch or click into place when the conductive surface 302 is aligned and in conductive contact with the conductive surface 106.

Figure 5:
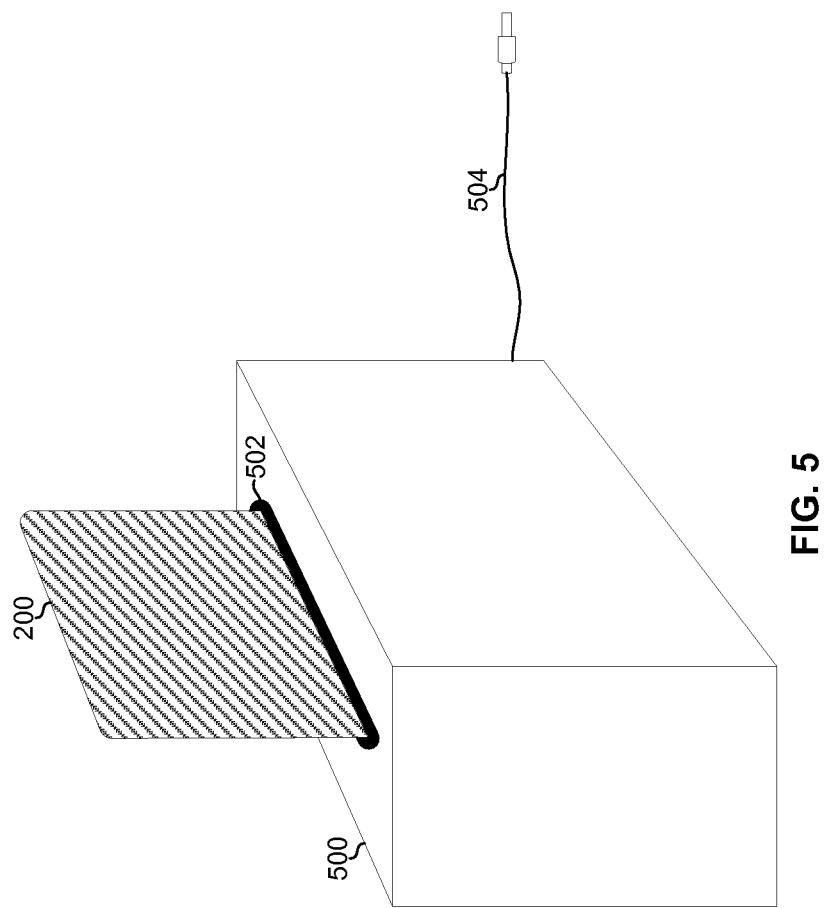
FIG. 5 depicts another exemplary smartcard interface device.

FIG. 5 depicts another exemplary smartcard interface device. Shown in FIG. 5, the smartcard interface device 500 has a form factor suitable for placement on a desktop, similar to other computer peripherals. The device 500 comprises a slot 502 into which a smartcard can be inserted. The device 500 may also comprise a chord 504 for powering the device 500 and/or communicating with a computer. The cord may, for example, be a USB chord.

Figure 6:
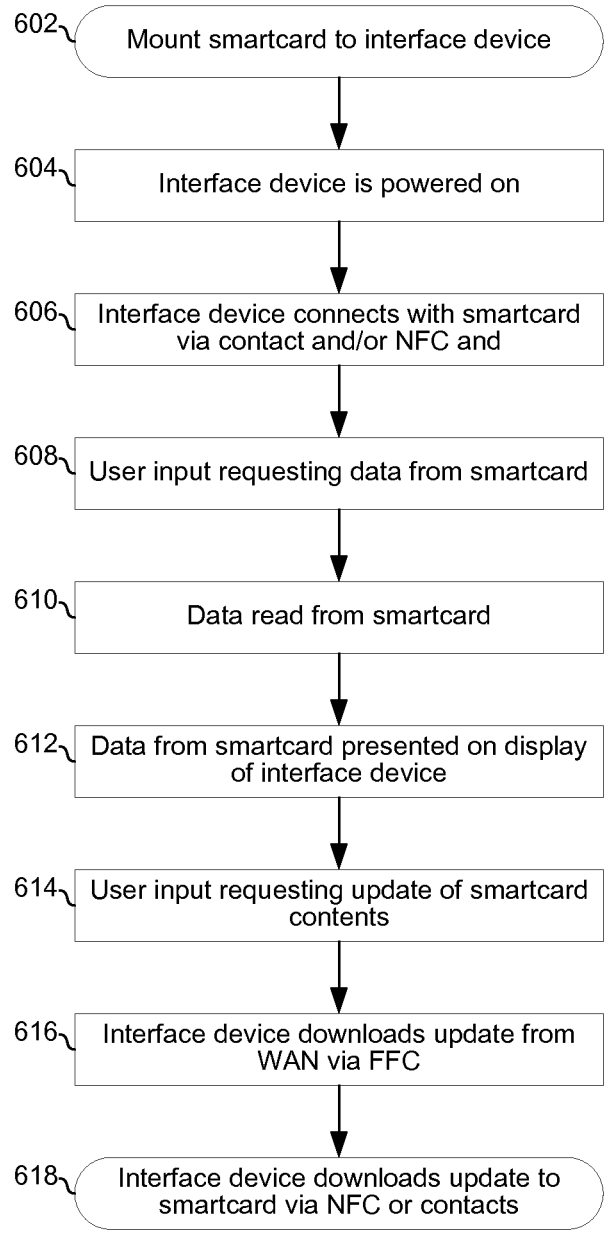
FIG. 6 is a flowchart illustrating exemplary steps in the operation of a smartcard interface device.

FIG. 6 is a flowchart illustrating exemplary steps in the operation of a smartcard interface device. The exemplary steps begin with step 602 in which the smartcard 300 is physically mounted in, on, and/or to the device 100 (e.g., slid, inserted, or placed into a slot, cavity, or other receptacle of the device). In step 604, the device 100 is powered on (e.g., in response to detecting the mounting of the smartcard 300 and/or in response to a user flipping the switch 104). In step 606, the device 100 may establish a wired (via the surfaces 106 and 302) and/or a wireless (via the near-field radio 202) communication link with the smartcard 300. In step 608, a user may enter a request to read data from the smartcard 300. The request may be input via the input device 110 and/or via a computing device coupled to the device 100 via the port 102. In step 610, in response to the user input, the device 100 may read data from the smartcard 300. In step 612, the data read from the smartcard 300 may be presented on the display 108. In step 614, the user may input, via the input device 110 and/or the port 102, a request to update contents of the smartcard 300. In step 616, the device 100 may connect to a remote device utilizing the far-field radio 208, and download data from the remote device. In step 618, the device 100 may write the downloaded data to the smartcard 300.

Figure 7:
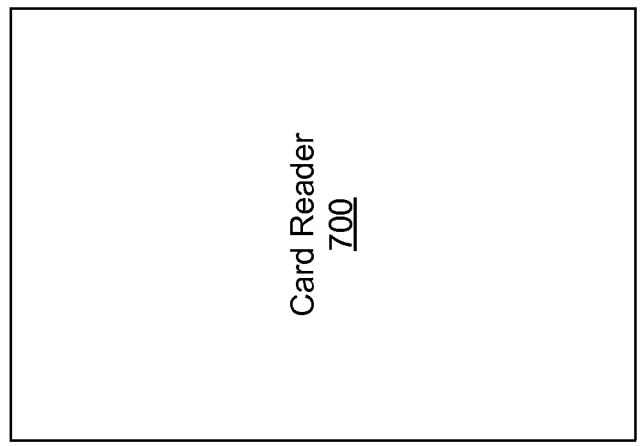
FIG. 7 is a diagram illustrating communications between a smartcard interface device and a card reader.
Figure 7:
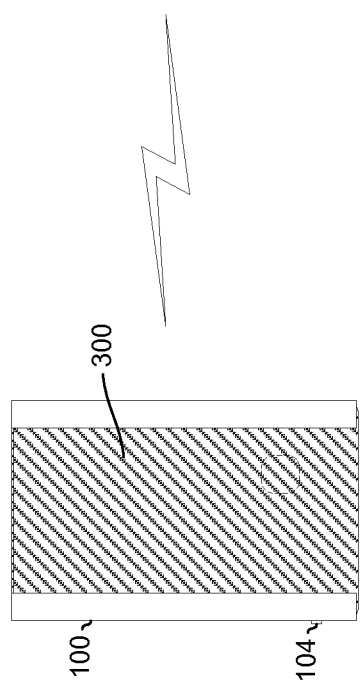

FIG. 7 is a diagram illustrating communications between a smartcard interface device and a card reader. Shown in FIG. 7 is a device 100 with smartcard 300 mounted in, on, and/or to the device 100, and a card reader 700. The card reader 700 may be, for example, a payment terminal or an ID badge reader that controls access to a location.

The device 100 may communicate, via a near-field communication link and/or a far-field communication link, with the card reader 700. Such communications may enable the device 100 to configure the card reader 700 and/or allow the card reader 700 to configure the device 100. This may comprise, for example, configuring permissions and/or other information associated with the smartcard 300 in the device 100 and/or in the card reader 700.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for interfacing with a smartcard.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An apparatus comprising:
   a device comprising one or more circuits that are operable to communicate over a far-field communication link and that are operable to communicate with a smartcard when said smartcard is physically mounted in, on, and/or to said device, wherein said device is configured such that, when said smartcard is physically mounted in, on, and/or to said device, said smartcard is in physical contact with said device and said smartcard is physically retained to said device.

2. The apparatus of claim 1, wherein:
   dimensions of said smartcard are in compliance with ISO 7816; and
   when said smartcard is physically mounted in, on, and/or to said device, said device can be rotated 360° along any and all axes without said smartcard losing physical contact with said device.

3. The apparatus of claim 1, wherein said one or more circuits are operable to communicate with said smartcard via a wireless, near-field communication link.

4. The apparatus of claim 1, wherein said far-field communication link is an ISO 18000-7 link.

5. The apparatus of claim 1, wherein:
   said one or more circuits comprise one or more conductive surfaces which come into conductive contact with one or more conductive surfaces of said smartcard when said smartcard is physically mounted in, on, and/or to said device; and
   said communicating with said smartcard is via said one or more conductive surfaces of said smartcard and said one or more conductive surfaces of said device.

6. The apparatus of claim 1, wherein said device comprises a non-volatile memory operable to store information communicated to a smartcard and/or information received from a smartcard.

7. The apparatus of claim 1, wherein said device is operable to read information out of a smartcard utilizing a near-field communication link and transmit said read-out information to a card reader utilizing said far-field communication link.

8. The apparatus of claim 1, wherein said device is operable to receive information from a card reader via a near-field communication link and store said received information to a smartcard utilizing a contact-based communication link.

9. The apparatus of claim 1, wherein:
   said device is configured such that a plurality of smartcards can be physically mounted in, on, and/or to said device; and
   said device is operable to selectively communicate with said plurality of smartcards when said plurality of smartcards are physically mounted in, on, and/or to said device.

10. The apparatus of claim 1, wherein:
    said device is generally rectangular in shape;
    said device is less than one centimeter thick;
    said device is less than one centimeter longer than an ISO 7816 compliant smartcard
    said device is less than one centimeter wider than an ISO 7816 compliant smartcard.

11. The apparatus of claim 1, wherein said one or more circuits extend a range at which a smartcard physically mounted in, on, and/or to said device can communicate by operating as a repeater that translates between near-field and far-field communications.

12. A method comprising:
    in a device that comprises one or more circuits, and that is configured such that a smartcard may be physically mounted in, on, and/or to said device so as to be in physical contact with said device and physically retained to said device:
    communicating, via said one or more circuits, over a far-field communication link; and
    communicating, via said one or more circuits, with a smartcard that is physically mounted in, on, and/or to said device.

13. The method of claim 12, wherein:
said smartcard is an ISO 7816 compliant smartcard; and
when said smartcard is physically mounted in, on, and/or to said device, said device can be rotated 360° along any and all axes without said smartcard losing physical contact with said device.

14. The method of claim 12, wherein said communicating with said smartcard is via a wireless, near-field communication link.

15. The method of claim 12, wherein said far-field communication link is an ISO 18000-7 link.

16. The method of claim 12, wherein said communicating with said smartcard is via one or more conductive surfaces of said smartcard which physically contact one or more conductive surfaces of said device.

17. The method of claim 12, comprising storing information communicated to and/or information received from said smartcard in a non-volatile memory of said device.

18. The method of claim 12, comprising reading information out of said smartcard utilizing a near-field communication link and transmitting said read-out information to a card reader utilizing said far-field communication link.

19. The method of claim 12, comprising receiving information from a card reader via a near-field communication link and storing said received information to said smartcard utilizing a near-field communication link.

20. The method of claim 12, wherein:
said device is configured such that a plurality of smartcards can be physically mounted in, on, and/or to said device; and
said device is operable to selectively communicate with said plurality of smartcards when said plurality of smartcards are physically mounted in, on, and/or to said device.

* * * * *